Patented June 20, 1944

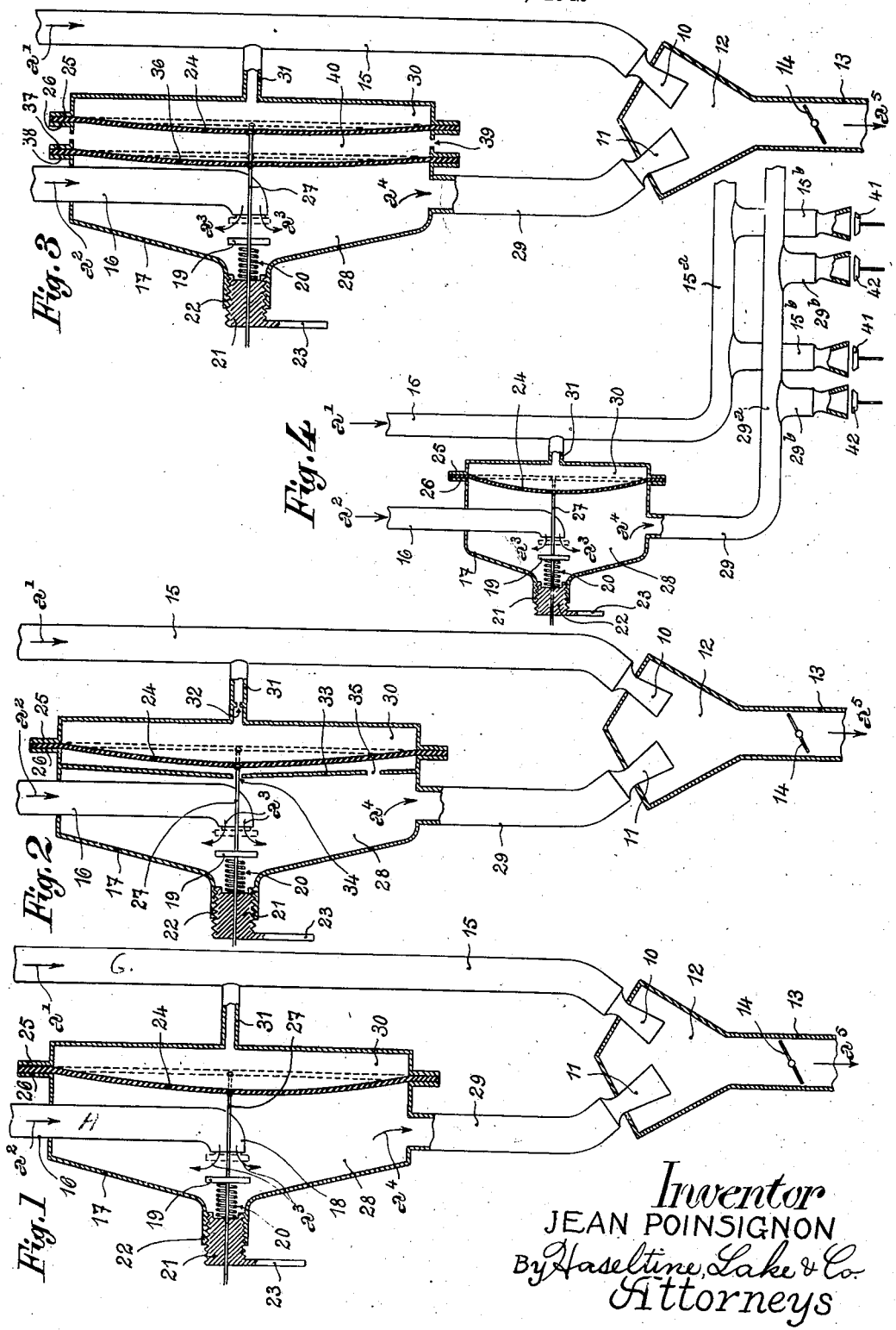

2,352,003

UNITED STATES PATENT OFFICE 2,352,003

DEVICE FOR SUPPLYING GASEOUS MIX-
TURES TO INTERNAL COMBUSTION
ENGINES

Jean Poinsignon, Clermont-Ferrand, France;
vested in the Alien Property Custodian Application March 14, 1942, Serial No. 434,667
In France October 16, 1940

6 Claims. (Cl. 48—184)

The present invention relates to the feeding of internal combustion engines by means of gaseous fuels and has for its primary object to provide a device of improved and simplified construction for feeding this type of engines with a constant composition mixture of combustible gas such as lighting gas or producer gas (hereafter called "gas") and of combustion-promoting gaseous fluid such as atmospheric air (hereafter called "air") so as to keep the kinetic efficiency of the engine as steady as possible.

Another object of the invention is to provide a gaseous mixture feeder wherein the inflow of the two constituents of the mixture is so automatically adjusted that the richness of said mixture remains substantially constant and the volume of gaseous mixure fed to the engine copes at all times with its rate of operation and consumption.

Still another object of the invention is to provide for feeding a gaseous fuel mixture to an internal combustion engine a device comprising mixture-intermingling means associated with self-regulating means whereby any pressure decrease in the gaseous fuel inflow, for example due to clogging of the scrubber interposed between the gas producer and the device, is automatically compensated so as to maintain the ratio of the mixture constituents substantially constant.

A further object of the invention is to provide a gaseous fuel mixture feeder for an internal combustion engine, the operation of which is so automatically adjustable as to ensure constancy of mixture regardless of the position of the throttle valve controlling the outflow of said mixture to the engine induction manifold.

With these and such other objects in view as will incidentally appear hereafter, the invention comprises the novel construction and combination of parts that will now be described in detail with reference to the accompanying drawing which exemplify several embodiments of the invention and form a part of the present disclosure.

In the drawing:

Figure 1 is a diagrammatic illustration of the simplest constructional form of device according to the invention.

Figure 2 is a similar view of a somewhat more elaborate constructional form of the device.

Figure 3 is a similar view of another constructional form comprising a flexible element made up of a pair of spaced membranes.

Figure 4 is a diagrammatic view drawn on a smaller scale of a constructional form similar to the one shown in Fig. 1 but comprising no mixing chamber for the gas and air.

Like reference characters designate like parts throughout the several views.

As illustrated in Figs. 1 to 3 inclusive, the device may comprise a pair of nozzles 10, 11 having Venturi outlines and projecting in converging relation through the oppositely slanting top sides of a mixing chamber 12 connected to an outlet pipe 13 fitted with a throttle valve 14 of conventional structure and operation and connected in turn with the engine induction manifold (not shown).

The nozzle 10 is provided at the end of a primary inlet pipe 15 through which a gaseous fuel such for example as lighting gas or producer gas may be admitted as shown by the arrow $a^1$. A secondary inlet pipe 16 serves for the intake of the air which flows as shown by the arrow $a^2$. The pipe 16 extends downwardly into a tightly closed casing or enclosure 17 and is elbowed at its lower end as shown at 18. The lower mouth 18 of the air intake pipe 16 is controlled by a disk-shaped valve 19 which is urged by a compression spring 20 into closing position. The spring 20 is coiled under suitable compression between the valve 19 and the adjacent end face of an adjuster screw 21 engaged in a tapped nipple 22 on the casing 17 and having an extension 23 by which it can be conveniently operated manually for varying the pressure exerted by the spring on the valve.

In the constructional form shown in Fig. 1, the inside of the casing 17 is divided into a pair of compartments sealed from each other by a resilient depressible membrane 24 having its peripheral edge tightly clamped between contiguous flanges 25, 26 formed on the outer wall of the casing 17. The central region of the membrane 24 which may be suitably reinforced or fitted with a small stiff member to that effect has a rigid connection 27 in the form of a push rod with the disk valve 19. The left hand side or secondary compartment 28 defined by the membrane 24 and the inner wall of the casing 17 is connected with the nozzle 11 by means of a tube 29. The right hand side or primary compartment 30 also defined by the membrane 24 and the inner wall of the casing 17 communicates by means of a pressure-tapping tube 31 of small sectional area with the gas intake or primary pipe 15.

Briefly described, the operation of the device shown in Fig. 1 is as follows: At rest, the membrane 24 and the disk valve 19 occupy the positions shown in dotted lines. Therefore, the air cannot flow into the mixing chamber 12. However, when the engine (not shown) is started, there occurs a depression which propagates itself through the induction manifold and up through the mixing chamber 12. This depression draws the gas through the intake pipe 15 and by creating a partial vacuum in the secondary compartment 28 of the enclosure 17 unseats the valve 19 against the antagonistic resistance exerted by the spring 20, so that the air can flow along the path shown by the arrows $a^2$, $a^3$ and $a^4$ into the chamber 12 wherein it becomes mixed with the gas fed into it through the nozzle 10. From the mixing chamber 12, and assuming of course the throttle valve 14 to be open, the gaseous mixture flows as shown by the arrow $a^5$ through the induction pipe 13 towards the engine (not shown). As will be understood, the casing 17 divided by the flexible membrane 24 into a pair of compartments 28, 30 respectively connected to the air and gas sources of supply functions as a pressure regulator or equalizer since the membrane assumes a position of hydrostatic equilibrium governed by the gas pressure in the compartment 30 and the depression which prevails in the compartment 28. Thus the flow of air into the compartment 28 is suitably controlled or throttled by the valve 19 to match the gas pressure prevailing at any moment and propagating itself through the small tube 31. Assuming the nozzles 10, 11 to have, so far as the flow of the two fluids is concerned, the same characteristics (which may be readily reckoned in a mathematical way in accordance with known laws of thermodynamics) it will be seen that insofar as the equality of pressure is preserved at the inlet of the nozzles 10, 11, the ratio of the quantities of gas and air which enter the mixing chamber 12 is maintained constant regardless of their original rates of feed through the pipes 15 and 16. By varying the degree of compression of the spring 20 by means of the adjuster screw 21, the flexible distortion of the membrane 24 may be more or less checked to suit prevailing conditions. Such an adjustment being performed when required so as to throttle the air flow, the new position of hydrostatic equilibrium of the membrane will bring about a reduction of the air pressure in the compartment 28 with respect to the gas pressure in the compartment 30. This will lessen the rate of air flow through the nozzle 11 and will consequently cause an enrichment of the gaseous mixture while still automatically maintaining constant the ratio of its gas and air constituents irrespective of the feed rates in the intake pipes 15 and 16. Such action will make it possible to compensate for any loss which may happen in the calorific value of the gas, due for example to fluctuations in the operation of the gas producer or to similar causes. A reverse adjustment may be readily effected if and when on the contrary the gas grows richer.

The constructional modification shown in Fig. 2 comprises in the tube 31 of small sectional area which interconnects the primary pipe 15 and the primary compartment 30 of the pressure-regulating chamber 17 additional throttling means which may be constituted for example by a perforated or foraminous diaphragm 32. The purpose of these throttling means is to prevent the membrane 24 from oscillating or vibrating due to the repercussions caused by the reciprocatory motion of the pistons in the cylinders of the engine (not shown). This constructional modification further comprises a partition 33 firmly secured to the inner wall of the casing 17 and formed with a central hole 34 through which the push rod 27 is freely guided and with a port 35 which provides the necessary communication between the left hand side portion of the compartment 28 and its right hand side portion adjacent the flexible membrane 24.

In the other constructional modification shown in Fig. 3, there is provided a second flexible membrane 36 also secured to the push rod 27 so as to move in unison with the first membrane 24. The peripheral edge of this second membrane 36 is tightly clamped between a pair of flanges 37, 38 formed on the wall of the casing 17. One or more holes such as 39 are provided in the casing 17 to establish a free communication between the space 40 defined between the membranes 24 and 36 and the atmospheric air. The purpose of this arrangement is principally to preclude the formation of a detonating gaseous mixture inside the pressure regulator if somehow the gas in the compartment 30 percolates through the membrane 24. Such a risk is particularly to be feared where such gases as acetylene or hydrogen are used. In the modified arrangement shown in Fig. 3, should the membrane 24 leak and the gas penetrate into the inter-membrane space 40, it readily escapes through the outlet hole or holes 39 and any cause of accident is thus inhibited.

The constructional modification shown in Fig. 4 comprises no mixing chamber such as the one shown at 12 in Figs. 1 to 3 inclusive. In this modification, the intermingling of the two constituents of the gaseous mixture takes place in the various cylinders of the engine. Such cylinders are not shown in the drawing as they may be of any conventional form, as will be understood by anyone skilled in the art. In this construction, the intake pipe 15 extends to form a distribution manifold 15a which is divided into a number of branch pipes 15b equal to the number of the engine cylinders. Each branch pipe advantageously has the Venturi outline as shown. The flow of the gas through each branch pipe 15b is controlled by a suitable valve such as a poppet valve 41 suitably operated with proper timing by any cam mechanism by means common in the manufacture of internal combustion engines. The pipe 29 similarly extends to form a distribution manifold 29a which is provided with a number of branch pipes 29b equal to the number of the engine cylinders. Each branch pipe 29b advantageously has the Venturi outline shown. The flow of air through each branch pipe 29b is controlled by a suitable valve such as a poppet valve 42 suitably operated with proper timing by a cam mechanism as above stated. The actuations of the valves 41 and 42 are of course so suitably timed and co-related as to permit proper intermingling of the two constituents of the gaseous mixture fed to the engine cylinders. It will be seen that in this arrangement the detonating mixture forms itself inside each engine cylinder, whereby any danger of explosion outside the cylinder is prevented.

Throughout the foregoing description, it has been assumed that the primary intake pipe 15 is connected to the gas supply while the secondary intake pipe 16 is connected to the air supply. This, however, is not limitative and the reverse might be the case, the air being then drawn in through the intake pipe 15, while the gas would be drawn in through the intake pipe 16. The claims are correspondingly worded to include this alternative arrangement.

It will be seen that the aforesaid arrangement of parts permits the objects of the invention to be fulfilled inasmuch as, once the composition of the gaseous mixture has been manually adjusted to suit requirements, it is automatically maintained constant regardless of the operational speed and efficiency of the engine, of the position occupied at any moment by the throttle valve 14, and also of any loss of pressure which may happen in the gas feeding pipe up the pressure regulating device. This is due to the fact that in contradistinction to what exists in known feed devices the quantity of intake air admitted to the engine is not governed by the position of the throttle valve.

Numerous minor constructional details must be varied without departing from the scope of the subjoined claims which must be construed in a broad rather than in a limitative sense.

What is claimed is:

1. Device for feeding a gaseous mixture to an internal combustion engine, comprising a primary intake pipe for a constituent of the mixture, a secondary intake pipe for another constituent of the mixture, said secondary pipe being elbowed at its end, an enclosure into which the elbowed end of the secondary pipe projects, a flexible element tightly dividing said enclosure into separate primary and secondary compartments, a tube of small section interconnecting the primary intake pipe and primary compartment, a disk-shaped valve controlling exclusively the communication of said elbowed end with the secondary compartment, a spring urging said valve into closing position, a screw for manually adjusting the spring action, and a push rod interconnecting said flexible element and valve, both the primary intake pipe and secondary compartment communicating with the induction of the engine.

2. Device for feeding a gaseous mixture to an internal combustion engine, comprising a primary intake for a constituent of the mixture, a secondary intake for another mixture constituent, an enclosure, a flexible membrane tightly dividing said enclosure into separate primary and secondary compartments, a tube of small section interconnecting the primary intake and primary compartment, the end of the secondary intake projecting into the secondary compartment to provide communication therewith, a valve urged by spring means and controlling exclusively said communication, an adjuster for said spring means, a rigid interconnection between said membrane and valve, a mixing chamber communicating with the engine induction, and a pair of equivalently acting nozzles respectively connected with the primary intake and secondary compartment and both projecting beyond the wall of said mixing chamber into said mixing chamber.

3. Device for feeding a gaseous mixture to an internal combustion engine, comprising a primary intake for a constituent of the mixture, a secondary intake for another mixture constituent, an enclosure, a flexible membrane clamped along its periphery and tightly dividing said enclosure into separate primary and secondary compartments, a tube of small section interconnecting the primary intake and primary compartment, the secondary compartment being in communication with the secondary intake, a valve controlling exclusively said latter communication, spring means urging said valve into closing position, a hand-operated adjuster for said spring means, a rigid interconnection between said membrane and valve, a mixing chamber communicating with the engine induction manifold, and a pair of nozzles having Venturi outlines and identical thermodynamic characteristics respectively connected with both the primary intake and secondary compartment and projecting in converging relation into said mixing chamber.

4. Device for feeding a gaseous mixture to an internal combustion engine, comprising a primary intake for a constituent of the mixture, a secondary intake for another mixture constituent, an elongated enclosure, a flexible element clamped by its periphery and tightly dividing said enclosure into separate primary and secondary compartments, a throttled tube interconnecting the primary intake and primary compartment, the secondary compartment being in communication with the secondary intake, a valve controlling exclusively said latter communication, spring means urging said valve into closing position, an adjuster for said spring means, a rigid interconnection between said element and valve, a mixing chamber having oppositely slanting top faces and communicating with the engine induction, and a pair of thermodynamically equivalent throttled nozzles respectively connected with both the primary intake and secondary compartment and projecting in converging relation through said top faces of the mixing chamber.

5. Device for feeding an internal combustion engine with a gaseous mixture, comprising a primary intake for a constituent of the mixture, a secondary intake for another mixture constituent, an enclosure, a ported partition in said enclosure, a flexible pressure-responsive element clamped by its periphery in the enclosure and dividing it into separate primary and secondary compartments, a tube of small section interconnecting the primary intake and primary compartment, a throttling diaphragm in said tube, the secondary compartment being in communication with the secondary intake, a valve controlling exclusively said latter communication, spring means urging said valve into closing position, an adjuster for said spring means, a rigid interconnection between said flexible elements and valve, a mixing chamber communicating with the engine induction, and a pair of thermo-dynamically equivalent nozzles respectively connected with both the primary intake and secondary compartment and projecting into said mixing chamber at an angle to each other.

6. A feeding device as recited in claim 1 wherein a mixing chamber is arranged between the engine and said enclosure, the primary intake pipe terminating in a nozzle projecting angularly through the wall of said mixing chamber into the interior thereof, and a pipe connecting said secondary compartment with said mixing chamber, which pipe terminates in a nozzle projecting through the wall of said mixing chamber into the interior thereof at an angle converging toward said first-mentioned nozzle.

JEAN POINSIGNON.